(12) United States Patent
Kozawa et al.

(10) Patent No.: US 7,437,926 B2
(45) Date of Patent: Oct. 21, 2008

(54) AIR FLOW RATE MEASURING DEVICE

(75) Inventors: Masayuki Kozawa, Hitachinaka (JP); Makoto Iida, Kawasaki (JP); Akio Yasukawa, Kashiwa (JP); Mari Hikota, Hitachinaka (JP); Takahiro Miki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/758,292

(22) Filed: Jun. 5, 2007

(65) Prior Publication Data

US 2007/0295080 A1 Dec. 27, 2007

(30) Foreign Application Priority Data

Jun. 6, 2006 (JP) ............................. 2006-156753

(51) Int. Cl.
*G01F 1/68* (2006.01)

(52) U.S. Cl. .................................. 73/204.21

(58) Field of Classification Search .............. 73/204.26, 73/204.21, 202.5, 202
See application file for complete search history.

(56) References Cited

U.S. PATENT DOCUMENTS

| 4,210,016 A | * | 7/1980 | Peter et al. ............... 73/114.34 |
| 4,280,360 A | | 7/1981 | Kobayashi et al. |
| 5,253,517 A | * | 10/1993 | Molin et al. .............. 73/114.32 |
| 5,918,279 A | * | 6/1999 | Hecht et al. .............. 73/204.21 |
| 6,142,014 A | | 11/2000 | Rilling |

FOREIGN PATENT DOCUMENTS

| DE | 196 47 086 A1 | 5/1998 |
| EP | 0 588 626 A2 | 3/1994 |
| JP | 8-21761 A | 1/1996 |
| JP | 10-48021 A | 2/1998 |
| JP | 3245362 B2 | 10/2001 |

OTHER PUBLICATIONS

European Search Report dated Nov. 14, 2007 (fourteen (14) pages).

* cited by examiner

*Primary Examiner*—Jewel V Thompson
(74) *Attorney, Agent, or Firm*—Crowell & Moring LLP

(57) ABSTRACT

An air flow rate measuring device is provided in which a pressure loss across a grid therein due to the load which is generated when a hose band is tightened is reduced and deterioration of its measurement accuracy due to the grid deformation is prevented. The grid is configured to have a grid portion which absorbs deformation at the outer periphery thereof, and another grid portion which does not absorb deformation at the inner periphery thereof. In order to make the grid portions independent of each other, the grid is provided with a frame, and the mesh grid inside of the frame which maintains a rectifying effect, prevents the deterioration of the measurement accuracy, and does not absorb deformation, and the grid outside of the frame absorbs deformation.

37 Claims, 18 Drawing Sheets ured along a line II-II in FIG. 1;

AIR FLOW RATE MEASURING DEVICE

BACKGROUND OF THE INVENTION

The present invention relates to an air flow rate measuring device, and in particular to an air flow rate measuring device for measuring an air flow which is supplied to an internal combustion engine of an automobile.

Generally, a metal mesh, an aluminum honeycomb or a plastic is used to form a rectifier grid of an air flow rate measuring device. In the case of a plastic molding, as described in Japanese Patent No. 3245362, in order to maintain a mechanical strength and prevent deformation and deterioration of the grid, the plastic molding is configured to include a first mesh grid having a first thickness and spaces therein and a second rib grid having a thickness larger than the first one and spaces wider than in the first mesh grid, and the first mesh grid and the second rib grid are integrally formed with one another. Also, in order to address a load applied toward a center of a body of a device from an outer periphery thereof, a grid configuration is known which has a hexagonal second rib grid such as a honeycomb and a first mesh grid between the second rib grid so that the applied radial load can be spread out.

In the prior art, a deformation of the second rib grid leads to a deformation of the first mesh grid, and also a deformation of the second rib grid at the beginning of a tightening of a hose band or due to the radial load caused by a thermal factor causes a problem of deterioration of measurement accuracy of the air flow rate measuring device. In addition, the second rib grid is formed to have a sufficient thickness to maintain a mechanical strength of the rib grid, which results in a large pressure loss across the grid.

Therefore, there is a need for providing an air flow rate measuring device in which deterioration of its measurement accuracy can be prevented and a reduction of a pressure loss across a grid can be achieved in association with the radial load which is generated by a tightening of a hose band.

A tightening of a hose band generates two types of radial loads: one type is the load applied due to a configuration factor at the beginning of a tightening of a hose band, and another type is the load caused by a thermal factor, that is difference in coefficient of linear thermal expansion between the hose band and the body and a rectifier grid due to temperature changes. Therefore, the radial loads due to the two factors generate a stress which causes a deformation of a grid, and the deformation should be taken into the consideration to address the problem which is caused by the radial load at tightening the hose band.

In addition, because a resin exhibits creep, a deformation of a grid caused by the creep also should be taken into the consideration to address the problem.

One object of the present invention is to provide a flow measuring device or a flow measuring passage having grids which are not easily deformed.

BRIEF SUMMARY OF THE INVENTION

The above object is achieved by the invention as described in the appended claims.

For example, the above object can be achieved by a flow measuring device in which a grid includes a first grid portion and a second grid portion between the first grid portion and a passage forming component, and the second grid portion is more easily deformed than the first grid portion.

The present invention can provide an air flow rate measuring device of high performance and high reliability which reduces a pressure loss across the grid due to the load which is generated at a tightening of a hose band, prevents the deterioration of measurement accuracy of the air flow rate measuring device which is caused by the grid deformation, and enables the grid to have a configuration which achieves smaller pressure loss and high reliability.

Other objects, features and advantages of the invention will become apparent from the following description of the embodiments of the invention taken in conjunction with the accompanying drawings.

DETAILED DESCRIPTION OF THE INVENTION

Now, embodiments of the present invention will be described hereinafter with reference to the accompanying drawings.

Figure 1:
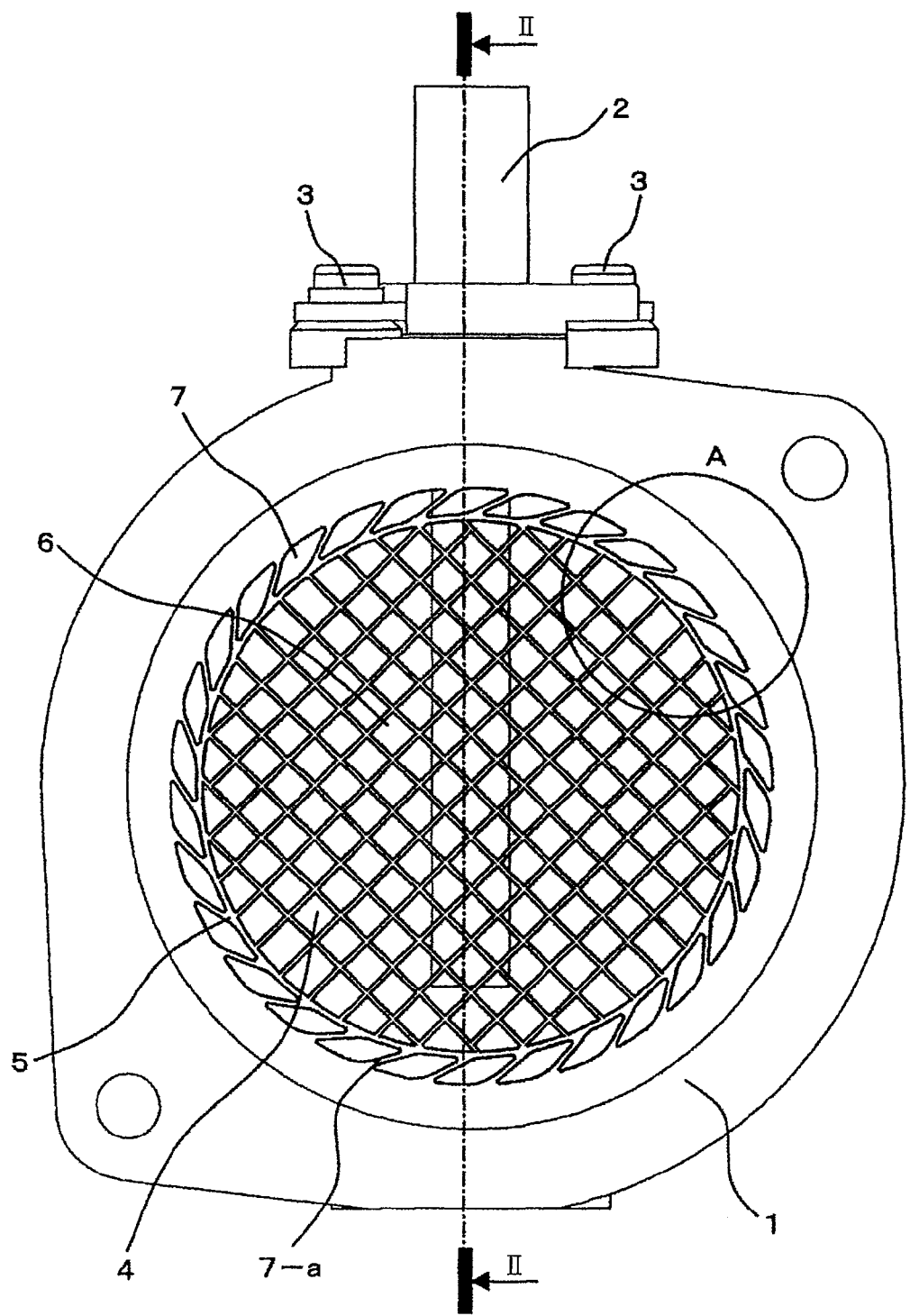
FIG. 1 is a front view of a first embodiment of an air flow rate measuring device according to the present invention, viewed from an upstream side of an air flow.
Figure 2:
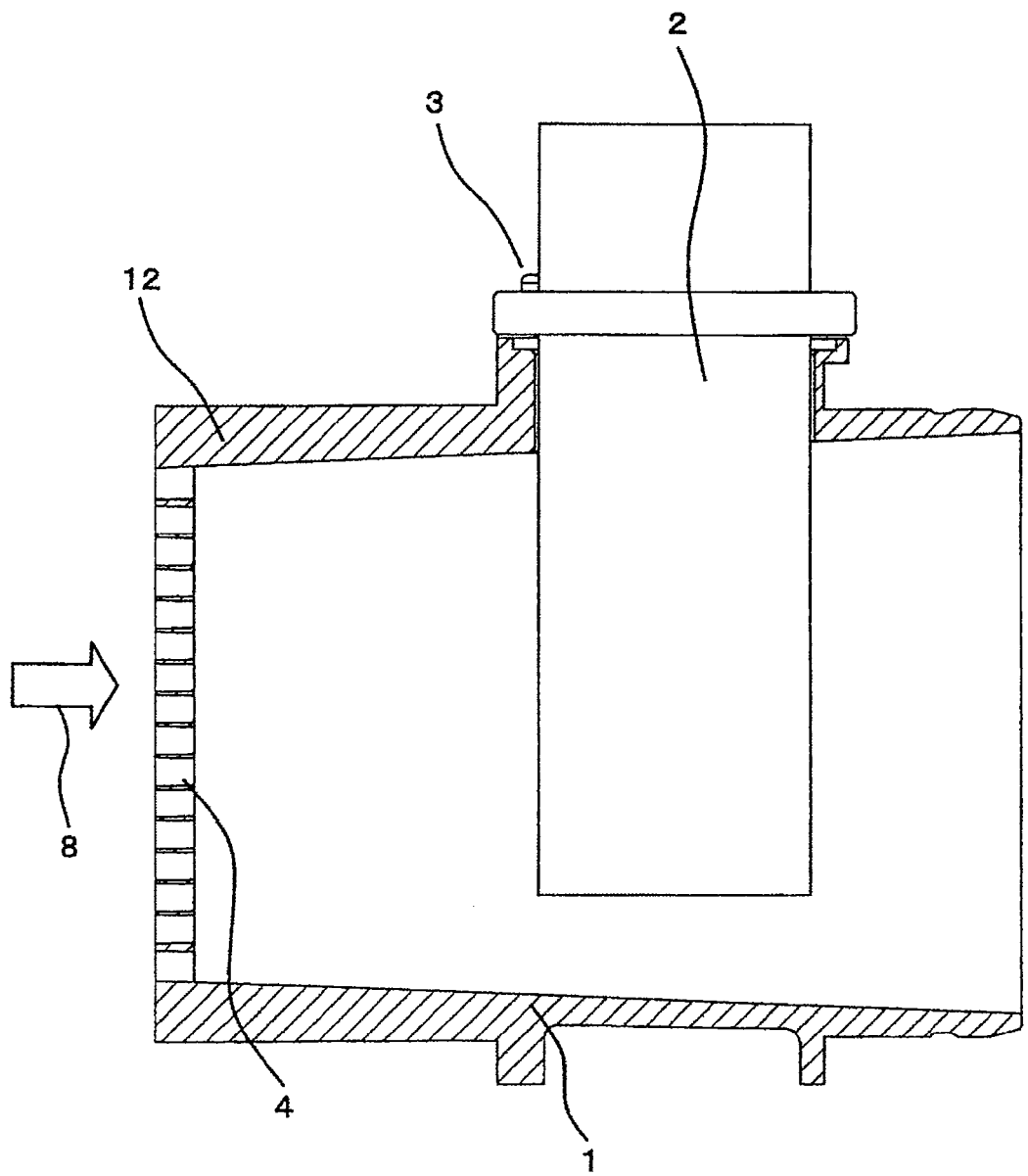
FIG. 2 is a sectional view taken along a line II-II in FIG. 1.
Figure 3:
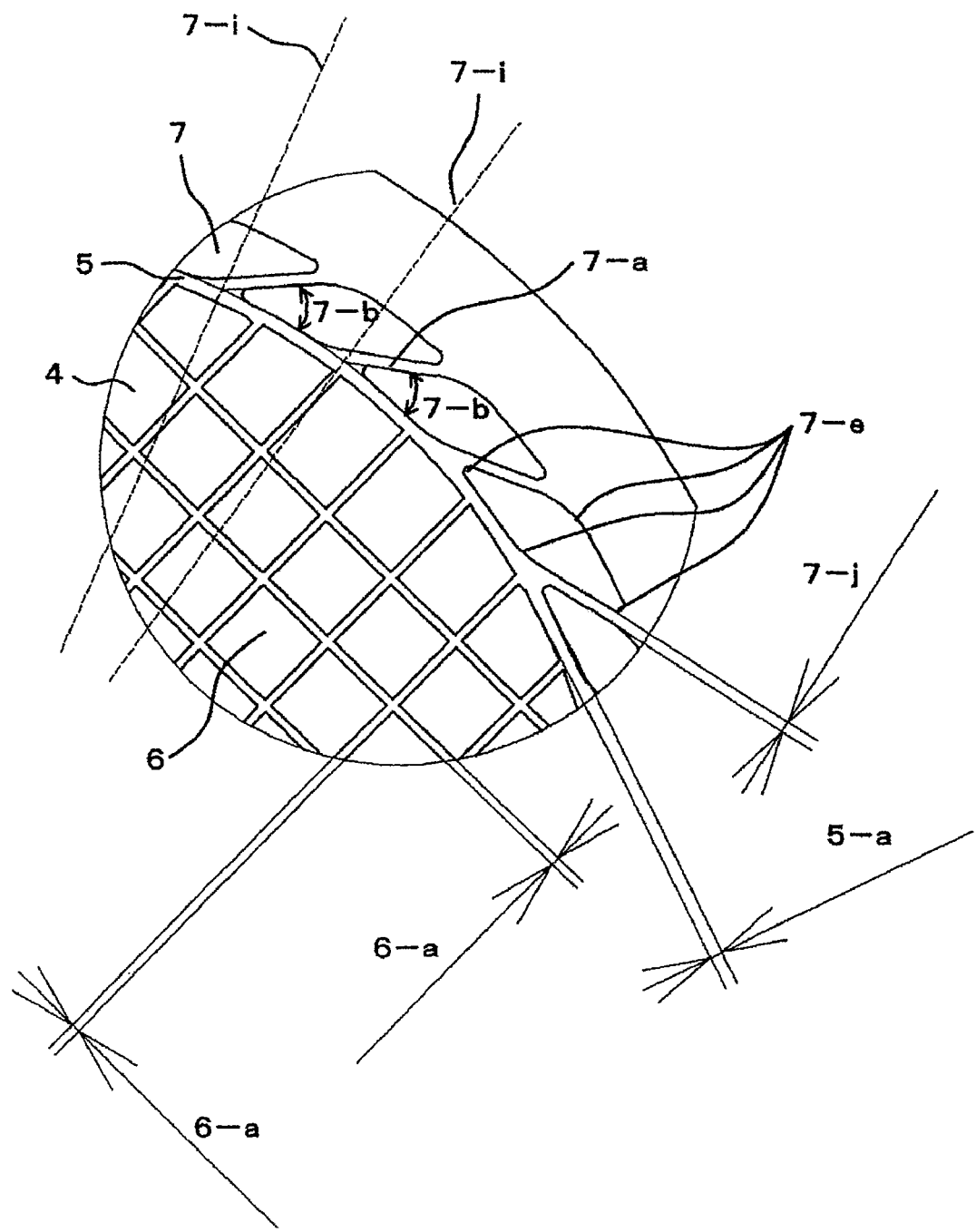
FIG. 3 is an enlarged view of the portion A in FIG. 1.
Figure 4:
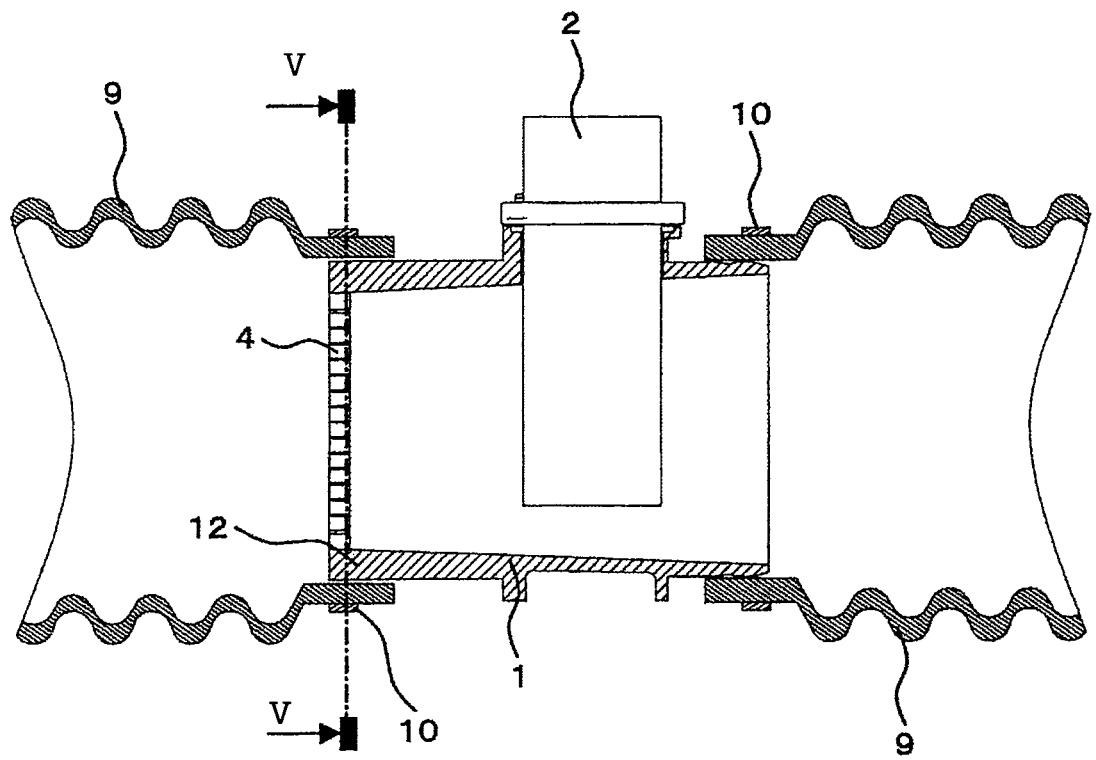
FIG. 4 is a sectional view showing an example of a layout of an automobile air intake system in which the first embodiment of the air flow rate measuring device according to the present invention is used.
Figure 5:
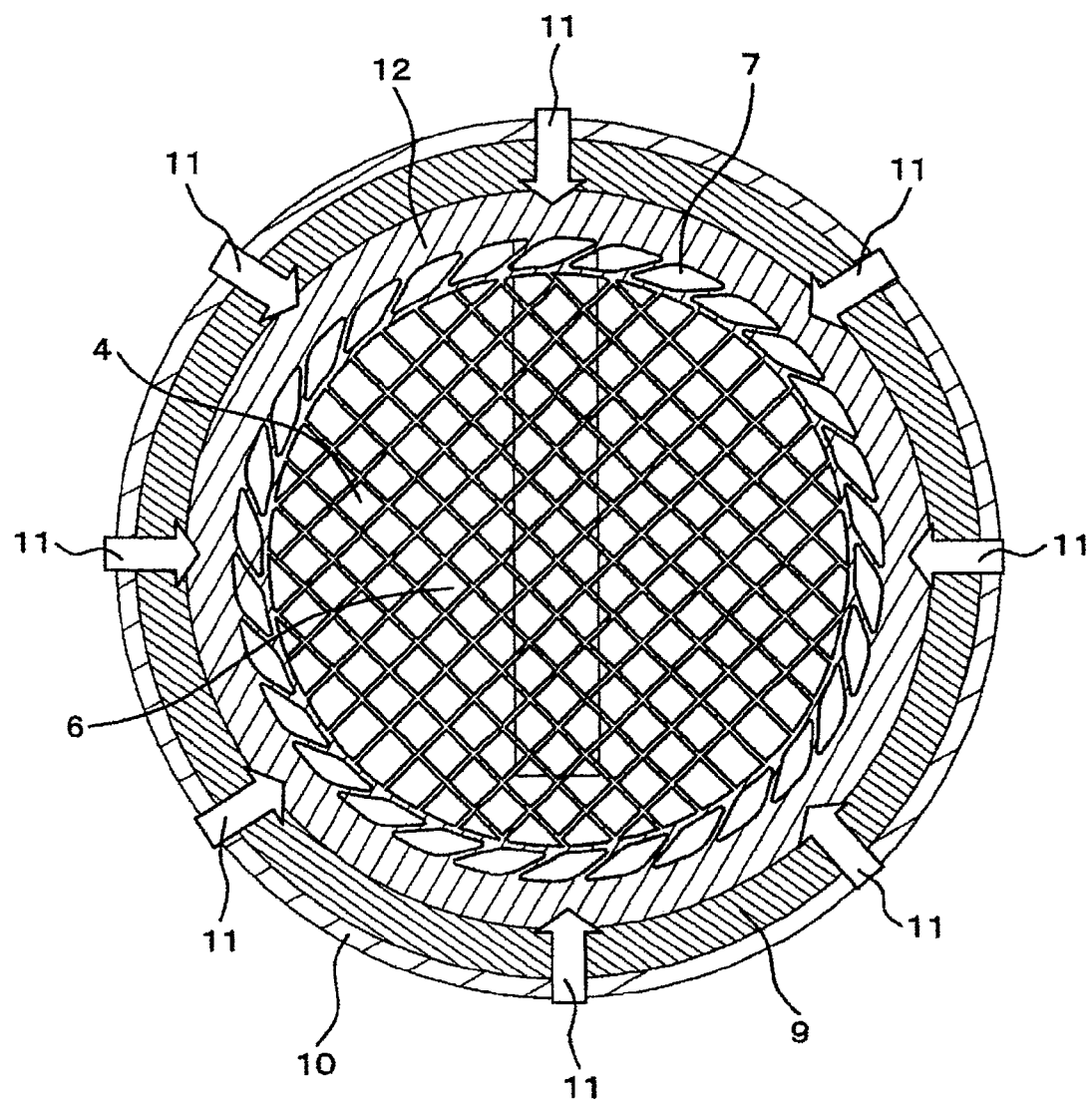
FIG. 5 is a sectional view taken along a line V-V in FIG. 4.
Figure 6:
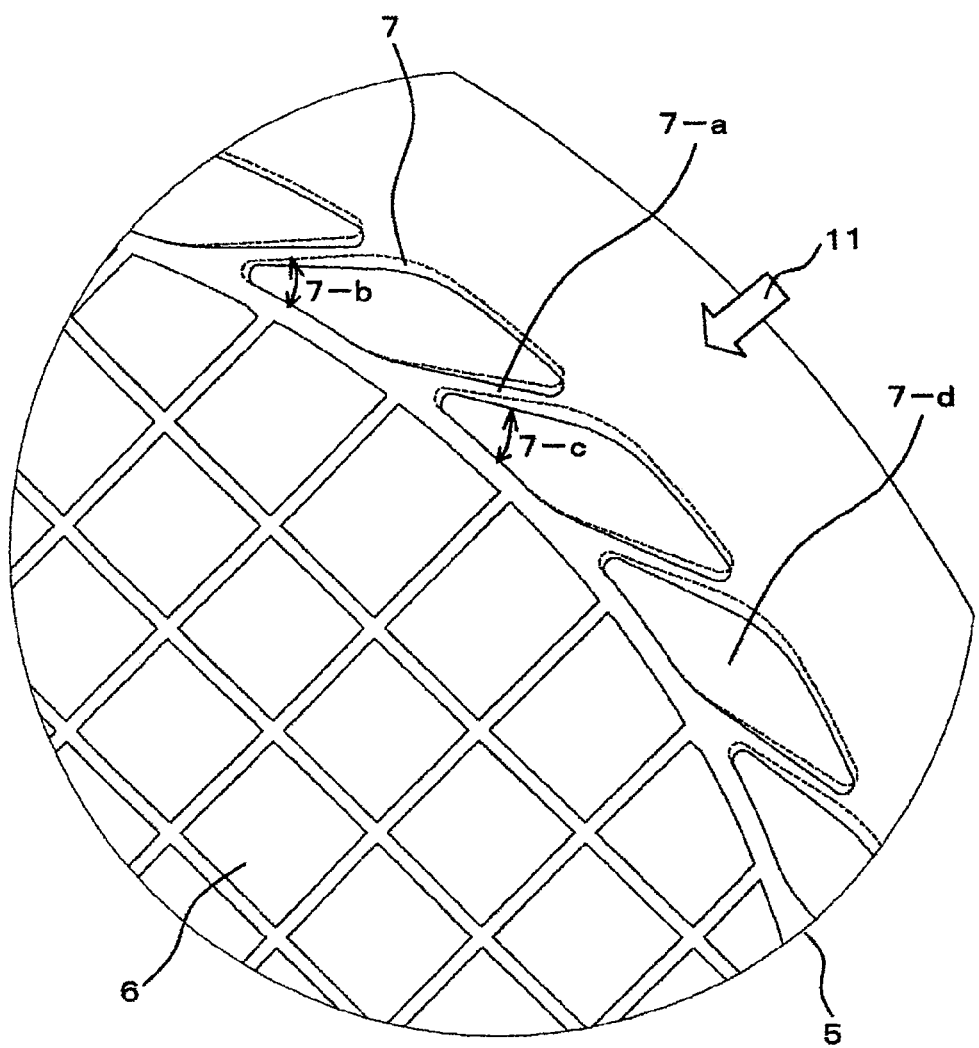
FIG. 6 is an enlarged view of the portion A in FIG. 1 and showing the first embodiment of the air flow rate measuring device, before and after a durability test, which is mounted to the air intake system shown in FIG. 4.

FIG. 1 is a front view of a first embodiment of an air flow rate measuring device according to the present invention, viewed from an upstream side of an air flow. FIG. 2 is a sectional view taken along a line II-II in FIG. 1. FIG. 3 is an enlarged view of the portion A in FIG. 1. FIG. 4 is a sectional view showing an example of a layout of an automobile air intake system in which the first embodiment of the air flow rate measuring device according to the present invention is used. FIG. 5 is a sectional view taken along a line V-V in FIG. 4. FIG. 6 is an enlarged view of the portion A in FIG. 1 and showing the first embodiment of the air flow rate measuring device, before and after a durability test, which is mounted to the air intake system shown in FIG. 4.

An air flow rate measuring device comprises a body 1 which has a circular cross section and forms a main passage for an intake air flow and a module 2 including a sensing element for sensing the air flow, and the body 1 and the module 2 are fixed to each other by screws 3. In the present embodiment, the screws 3 are used to fix the body 1 and the module 2, but the body 1 and the module 2 may be fixed to each other by welding or adhesive for example other than the screws, to have similar function and effect.

A rectifier grid 4 is provided inside the body 1 upstream of the module 2 in substantially perpendicular to an air flow 8. The rectifier grid 4 is arranged close to an upstream duct 12 of the body 1, and the rectifier grid 4 and the body 1 are integrally formed with each other by plastic.

The rectifier grid 4 comprises a circular frame 5, a mesh grid 6 and a grid 7. The circular frame 5 has a shape similar to a cross section of the body 1 and a diameter smaller than that of an inner diameter of the body 1. The mesh grid 6 is provided inside the circular frame 5 and is intended to rectify the air flow 8. The grid 7 has beams 7-a equiangularly spaced from each other. Each of the beams 7-a is arranged with an angle 7-b relative to a normal line 7-i which extends to a center of the circular frame 5. The rectifier grid 4 is formed by integrally forming the circular frame 5, the mesh grid 6, and the grid 7.

One ends of the beams 7-a which are an end face of the rectifier grid 4 are arranged to the body 1, so that the rectifier grid 4 is fixed to and supported by the body 1. In other words, the circular frame 5 having the mesh grid 6 therein is integrally and fixedly supported by the body 1 via both ends of each of the beams 7-a which is disposed between the body 1 and the circular frame 5, that is, via the grid 7. Further, the frame 5 is approximately concentrically disposed within the body 1.

The duct 12 of the body 1 is inserted into a rubber duct 9 and a metallic hose band 10 is tightened around the rubber duct 9 to fix the rubber duct 9 to the body 1.

The above configuration causes a radial load 11 from an outer periphery toward the center of the body 1 at the beginning of the tightening of the hose band 10, and the radial load 11 is transferred from an entire outer periphery to the rubber duct 9 and the duct 12 of the body 1. In addition, another radial load 11 from the outer periphery toward the center of the body 1 is caused due to a thermal factor, that is a difference in coefficient of linear thermal expansion among the hose band and the body and the rectifier grid due to temperature changes, and transferred from the entire outer periphery to the rubber duct 9 and the duct 12 of the body 1.

In the present embodiment, the beams 7-a are provided outside of the frame 5 of the rectifier grid 4 at the angle 7-b with respect to the radial load 11, and therefore the beams 7-a do not become struts against the radial load 11. In addition, the angle 7-b of the beams 7-a is changed to an angle 7-c due to the radial load 11, which allows the beams 7-a to absorb the radial load 11. This prevents the transfer of the radial load 11 to the mesh grid 6 via the beams 7-a. That is, the grid 7 outside of the frame 5 is configured to be easily deformed by the radial load 11 to a grid shape 7-d so as to enable the grid 7 to absorb the radial load 11.

This restrains the deformation of the mesh grid 6 inside the frame 5 which is caused by the radial load 11 when the hose band is tightened, and also prevents deterioration of the measurement accuracy of the device.

The rectifier grid 4 which is configured to absorb the radial load 11 by the deformation of the grid 7 makes it possible to reduce mechanical strength of the rectifier grid itself. Thus, strength required for the mesh grid 6 in the direction of its width 6-a can be reduced. The strengths required for the frame 5 and the grid 7 also can be reduced, so that width 5-a of the frame 5 and width 7-j of the beams 7-a can be approximately as thin as the width 6-a of the mesh grid 6, and the pressure loss across the rectifier grid 4 can be reduced.

For example, when the mesh grid 6 needs to have the minimum width 6-a of 0.4 mm for rectifying effect, the mesh grid 6 can have the same minimum width 6-a of 0.4 mm. Also, the width 5-a of the frame 5 and the width 7-j of the beams 7-a may be thin within a range from 0.4 mm, which is equal to the minimum width 6-a of the mesh grid 6, to 0.5 mm, which is about 1.25 times that of the minimum width 6-a and this configuration reduces the pressure loss across the rectifier grid 4 while maintaining the rectifying effect.

Each of the beams 7-a has chamfered portion 7-e at roots of both ends thereof. This relieves concentration of stress at the roots of both ends which is generated when the angle 7-b of the beams 7-a is changed to the angle 7-c. In addition, the rectifier grid 4 can be molded to have wide apertures at the beams 7-a, which improves its moldability.

The above configuration relieves the concentration of stress and prevents cracks due to the deformation, as well as improves its moldability.

In the present embodiment, the frame 5 is approximately concentrically disposed within the body 1, but even when the center of the frame 5 is offset from that of the body 1 for example, the device has similar functions and effects, which prevents deterioration of its measurement accuracy, reduces pressure loss, prevents cracks, and improves its moldability while maintaining the rectifying effect.

In the present embodiment, since the grid 7 provided outside the frame 5 of the rectifier grid 4 has the beams 7-a which are approximately equiangularly spaced and are inclined in substantially the same direction, the grid 7 can be substantially regular and uniform grid arrangement.

As a result, when the air flow 8 passes through the grid 7, the air flow 8 can be stabilized and the measurement accuracy of the device can be improved.

After a certain duration time, although the grid 7 absorbs the radial load 11 and is deformed due to the radial load 11, the deformed grid configuration 7-d can be also substantially regular and uniform.

Therefore, when the air flow 8 passes through the deformed grid 7-d after a certain duration time, the air flow 8 can be still stabilized and deterioration of the measurement accuracy of the device can be prevented.

Furthermore, in the present embodiment, the frame 5 of the rectifier grid 4 has substantially the same circular cross-sectional shape as the body 1 and is substantially concentrically disposed within the body 1, which enables the tilted grid 7 to have a substantially regular and uniform grid arrangement. And the deformed and tilted grid configuration 7-*d* due to the radial load 11 after a certain duration time can be also regular and uniform. This achieves an improvement of measurement accuracy of the device, and prevents deterioration of the measurement accuracy of the device.

According to the above configuration, the deformation of the mesh grid 6 in the rectifier grid 4 due to the radial load 11 at the beginning of tightening of a hose band or the thermal factor and its creep can be prevented, and the width 6-*a* of the mesh grid 6, the width 5-*a* of the frame 5, and the width 7-*j* of the beams 7-*a* of the rectifier grid 4 can be thinner. In addition, the tilted configuration of the grid 7 of the rectifier grid 4 can be regular and uniform, and the deformed grid 7-*d* due to the radial load 11 can have also a regular and uniform grid arrangement.

Therefore, the above configuration prevents deterioration of measurement accuracy of the air flow rate measuring device, reduces pressure loss across the device, and also improves the measurement accuracy, which achieves an air flow rate measuring device of high performance and high reliability.

Figure 7:
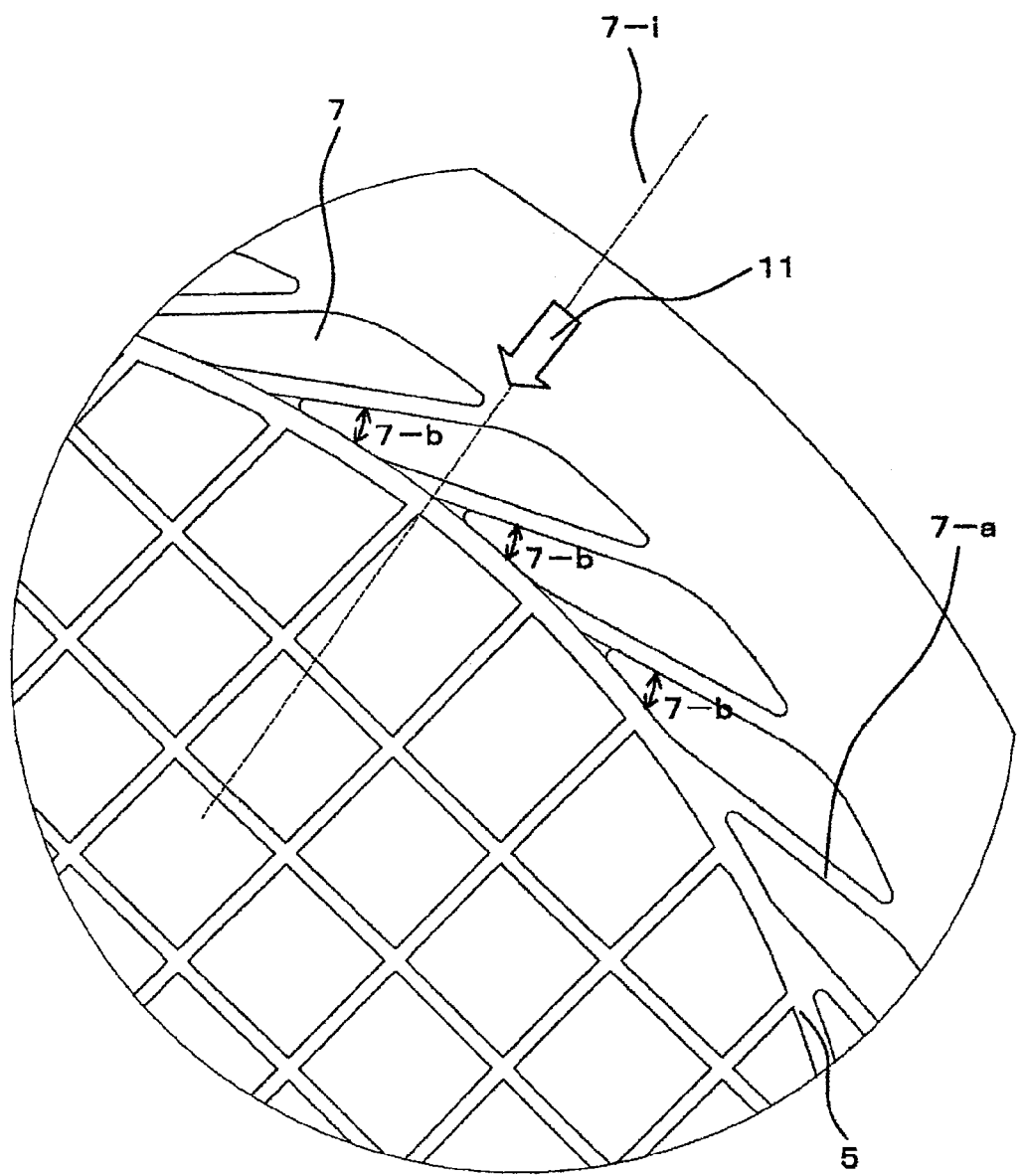
FIG. 7 is an enlarged view corresponding to FIG. 3 and showing a second embodiment of the air flow rate measuring device according to the present invention.

FIG. 7 shows a second embodiment of the air flow rate measuring device according to the present invention, and illustrates only the portion corresponding to the portion A in FIG. 1.

In the second embodiment, the grid 7 provided outside the frame 5 is configured to have beams 7-*a* which are arranged at an acute angle 7-*b* of 45 degrees or less relative to the normal direction 7-*i* toward the center of the frame 5.

According to the above configuration, since the grid 7 is easily deformed by the radial load 11, the effect to absorb the radial load 11 can be enhanced. The more acute the angle 7-*b* is, the more easily deformed the grid 7 is by the radial load 11, which also enhances the effect to absorb the radial load 11. As a result, deterioration of measurement accuracy of the air flow rate measuring device can be prevented.

Figure 8:
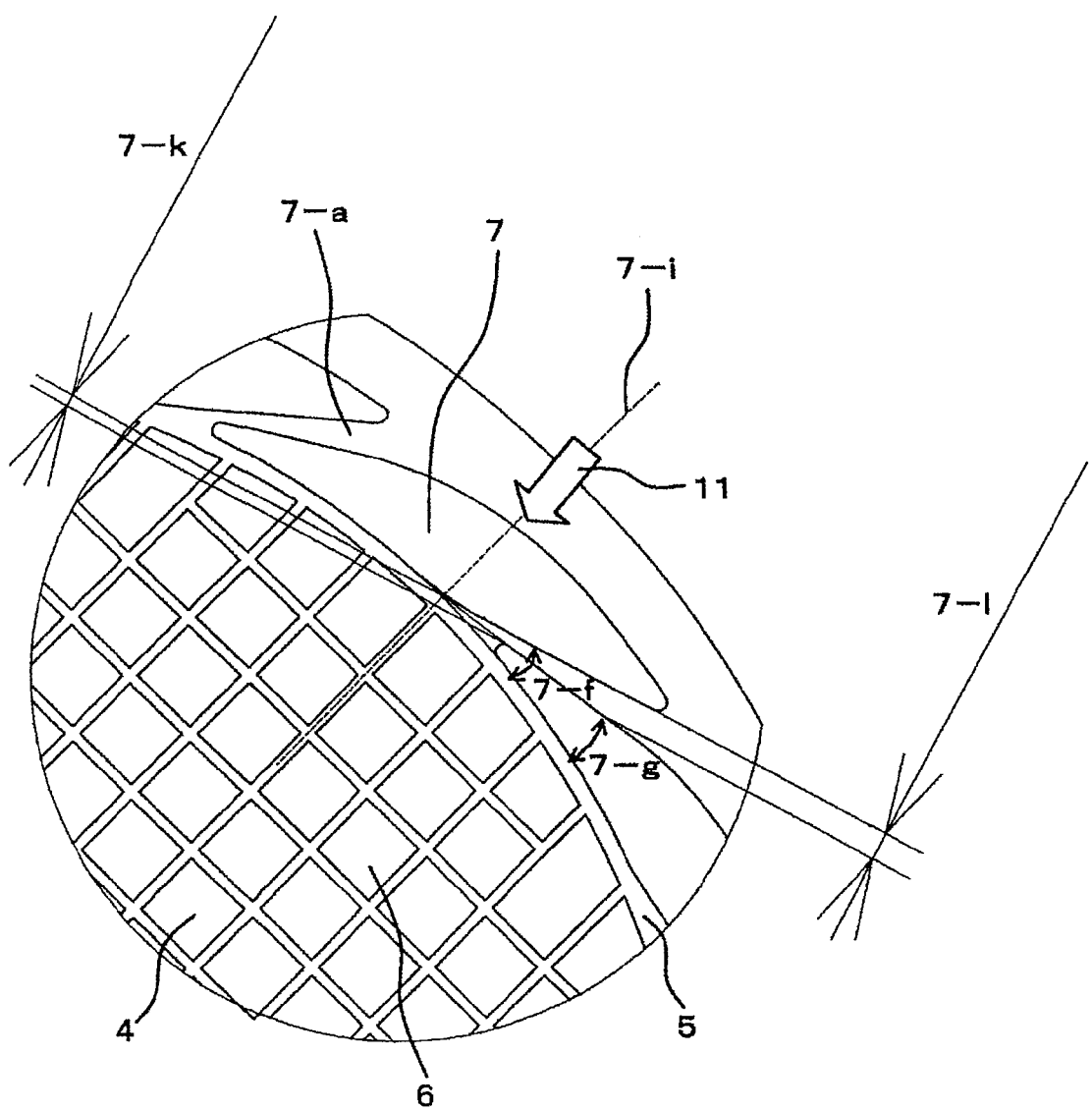
FIG. 8 is an enlarged view corresponding to FIG. 3 and showing a third embodiment of the air flow rate measuring device according to the present invention.

FIG. 8 shows a third embodiment of the air flow rate measuring device according to the present invention, and illustrates only the portion corresponding to the portion A in FIG. 1.

In the third embodiment, the grid 7 provided outside the frame 5 is configured to have beams 7-*a* which are arranged at an tilted angle relative to the normal direction 7-*i* which extends toward the center of the frame 5. Each of the beams 7-*a* has side surfaces which are tilted at different angles 7-*f* and 7-*g* respectively. The angles 7-*f* and 7-*g* are set so that the width of each of the beams 7-*a* tapers from the outer peripheral toward the center of the frame 5. That is, each of the beams 7-*a* has tilted side surfaces at different angles 7-*f* and 7-*g* respectively, and the angles 7-*e* and 7-*f* are set so that the width at both ends of each of the beams 7-*a* tapers from the body 1 toward frame 5. In other words, the grid 7 is configured to have beams 7 so that the width 7-*k* of the beams 7-*a* on the frame 5 side is less than the width 7-*l* of the beams 7-*a* on the body 1 side.

According to the above configuration, since the width of the beams 7-*a* which are provided between the body 1 and the frame 5 is set so that the width 7-*k* of the beams 7-*a* on the frame 5 side is less than the width 7-*l* of the beams 7-*a* on the body 1 side, the inner portion of beams 7-*a* on the width 7-*k* side which is close to the frame 5 is more easily deformed by the radial load 11, which enhances the effect to absorb the radial load 11. Also, the molding with a molten plastic which flows from the body 1 to the rectifier grid 4 can be achieved to provide wide apertures at the beams 7-*a*, which improves the moldability of the rectifier grid 4.

Therefore, the above configuration prevents deterioration of measurement accuracy of the air flow rate measuring device, while improving the moldability.

Figure 9:
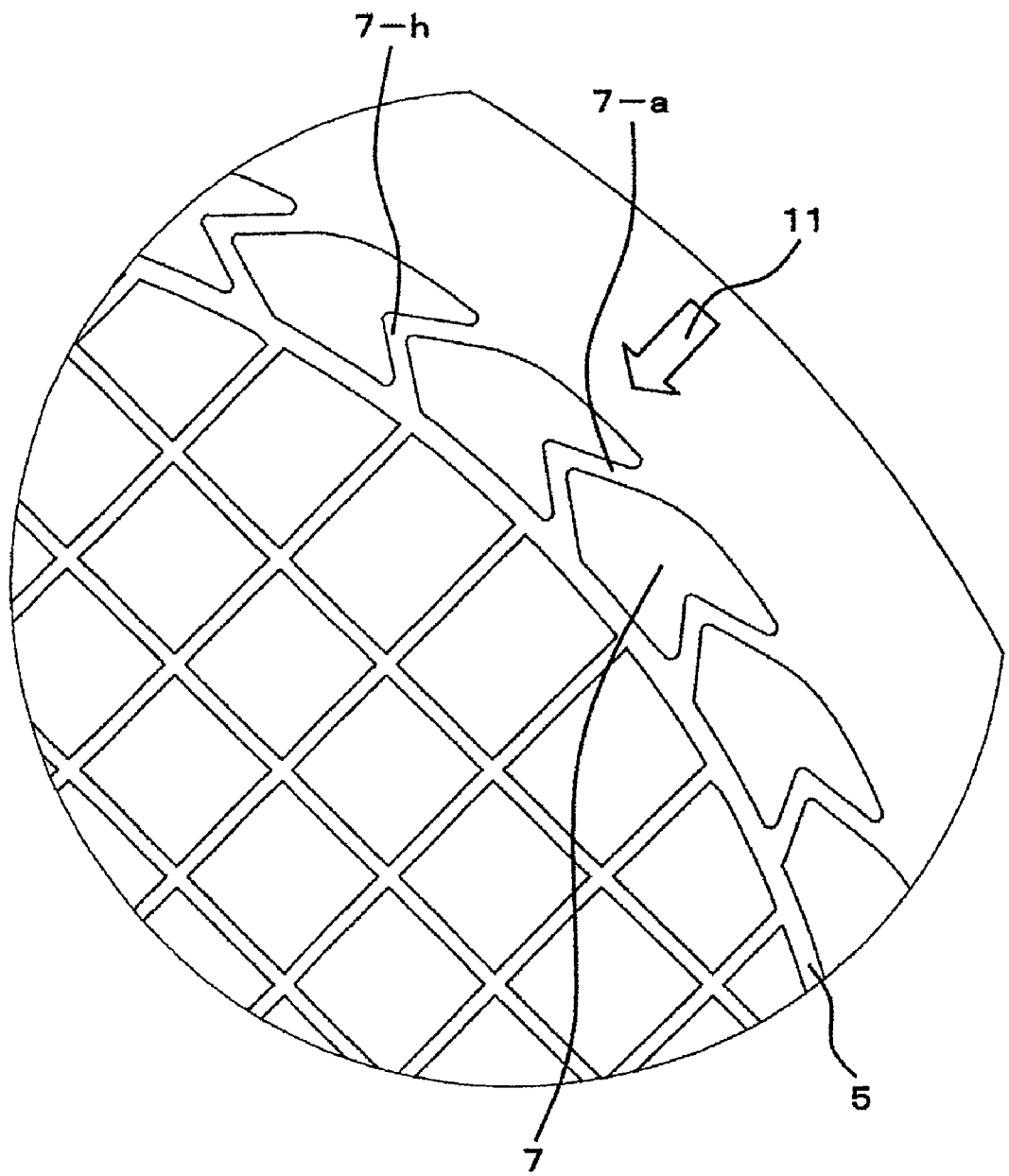
FIG. 9 is an enlarged view corresponding to FIG. 3 and showing a fourth embodiment of the air flow rate measuring device according to the present invention.

FIG. 9 shows a fourth embodiment of the air flow rate measuring device according to the present invention, and illustrates only the portion corresponding to the portion A in FIG. 1.

In the fourth embodiment, the grid 7 provided outside the frame 5 is configured to have the beams 7-*a* having a bent portion 7-*h*.

According to the above configuration, since the bent portion 7-*h* is easily deformed by the radial load 11, and the beams 7-*a* are more deformable, the effect to absorb the radial load 11 can be enhanced. As a result, deterioration of measurement accuracy of the air flow rate measuring device can be prevented.

Figure 10:
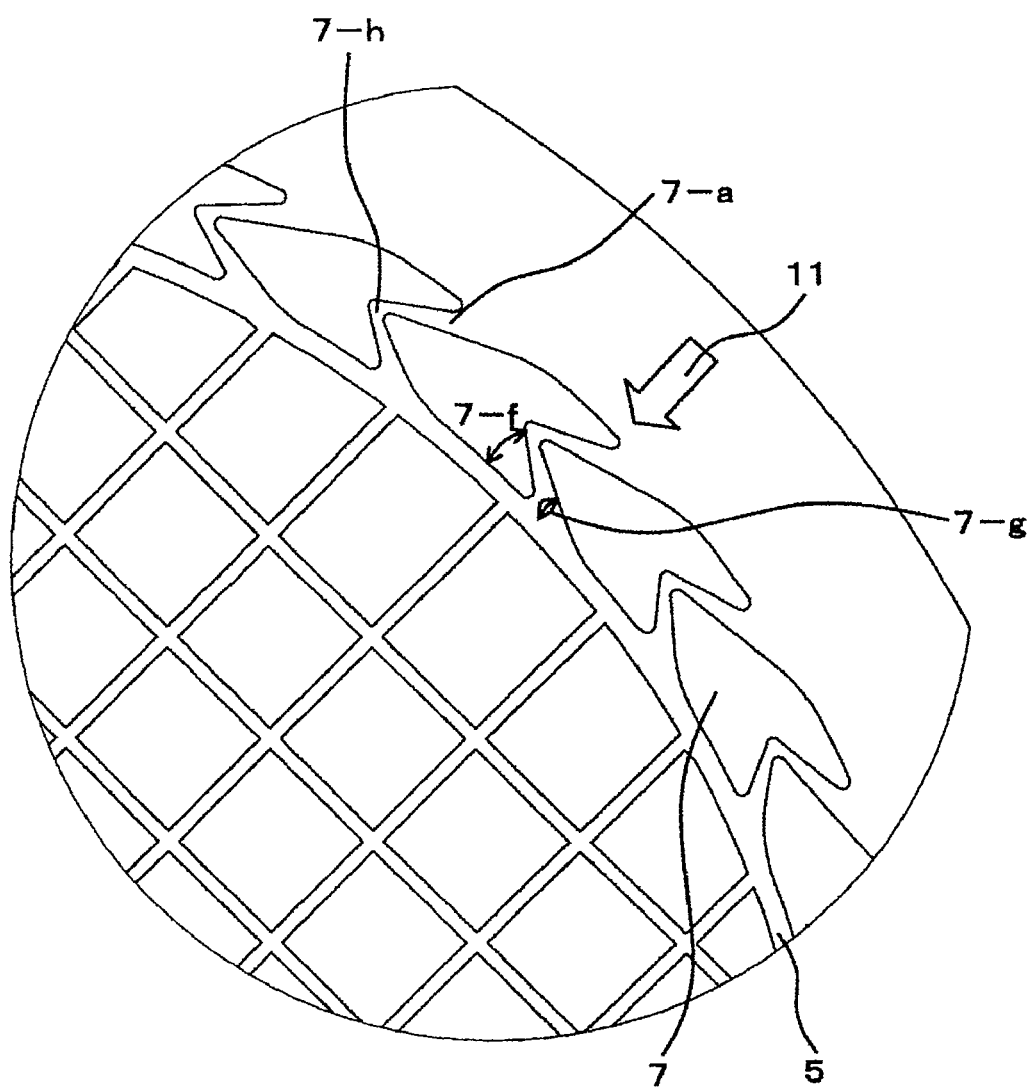
FIG. 10 is an enlarged view corresponding to FIG. 3 and showing a fifth embodiment of the air flow rate measuring device according to the present invention.

FIG. 10 shows a fifth embodiment of the air flow rate measuring device according to the present invention, and illustrates only the portion corresponding to the portion A in FIG. 1.

In the fifth embodiment, the grid 7 provided outside the frame 5 is configured to have the beams 7-*a* each of which is provided with the bent portion 7-*h*, and has side surfaces at different angles 7-*f* and 7-*g* respectively, and the angles 7-*f* and 7-*g* are set so that the width of the beams 7-*a* tapers toward the bent portion 7-*h*.

According to the above configuration, since the bent portion 7-*h* is easily deformed by the radial load 11, and the beams 7-*a* are more deformable, the effect to absorb the radial load 11 can be enhanced. As a result, deterioration of measurement accuracy of the air flow rate measuring device can be prevented.

Figure 11:
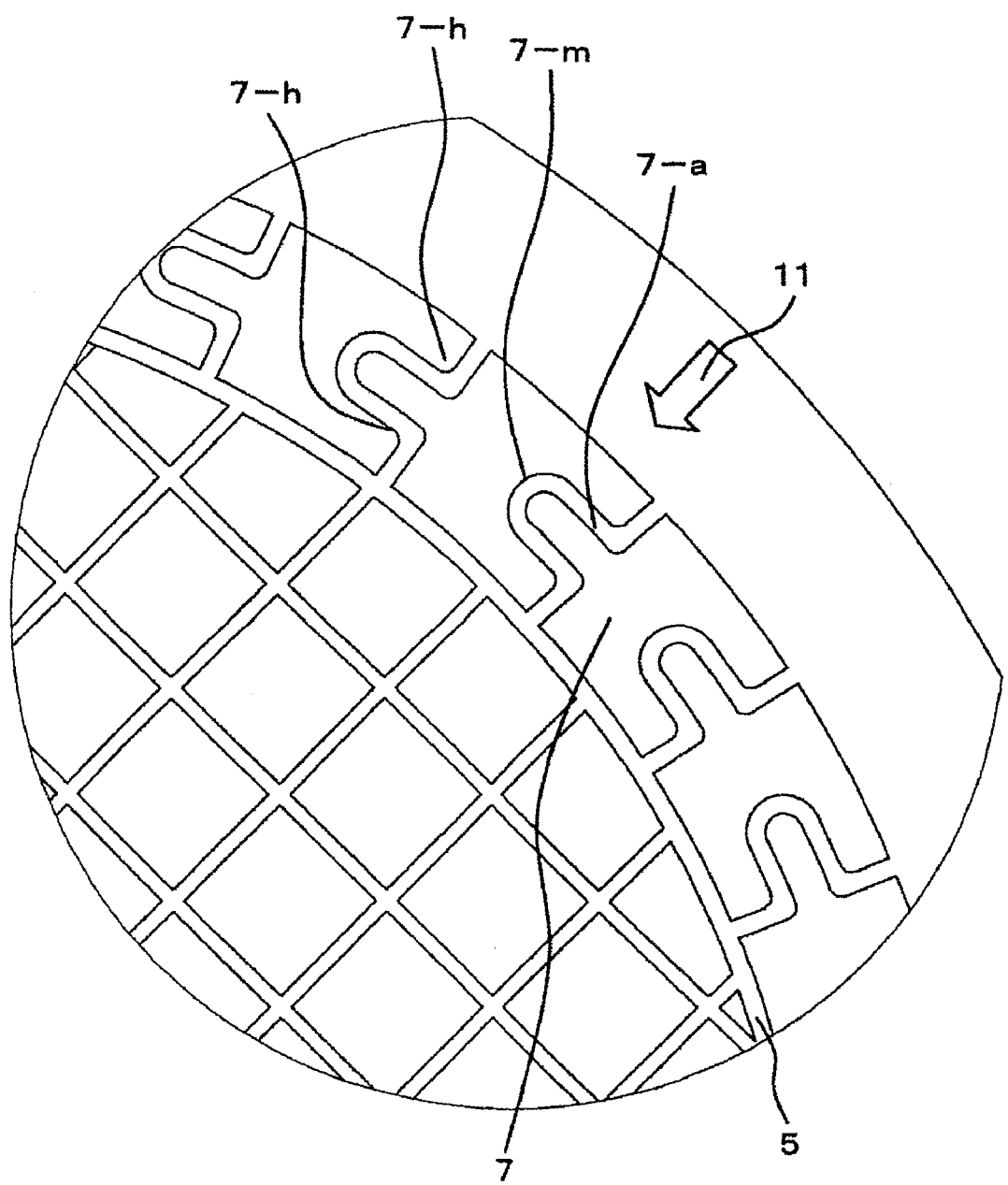
FIG. 11 is an enlarged view corresponding to FIG. 3 and showing a sixth embodiment of the air flow rate measuring device according to the present invention.

FIG. 11 shows a sixth embodiment of the air flow rate measuring device according to the present invention, and illustrates only the portion corresponding to the portion A in FIG. 1.

In the sixth embodiment, the grid 7 provided outside the frame 5 is configured to have the beams 7-*a* each of which is provided with two bent portions 7-*h* approximately at an angle of 90 degrees and an approximately semicircular portion 7-*m* therebetween.

According to the above configuration, since the semicircular portion 7-*m* is easily deformed by the radial load 11, and the beams 7-*a* are more deformable, the effect to absorb the radial load 11 can be enhanced. As a result, deterioration of measurement accuracy of the air flow rate measuring device can be prevented.

Figure 12:
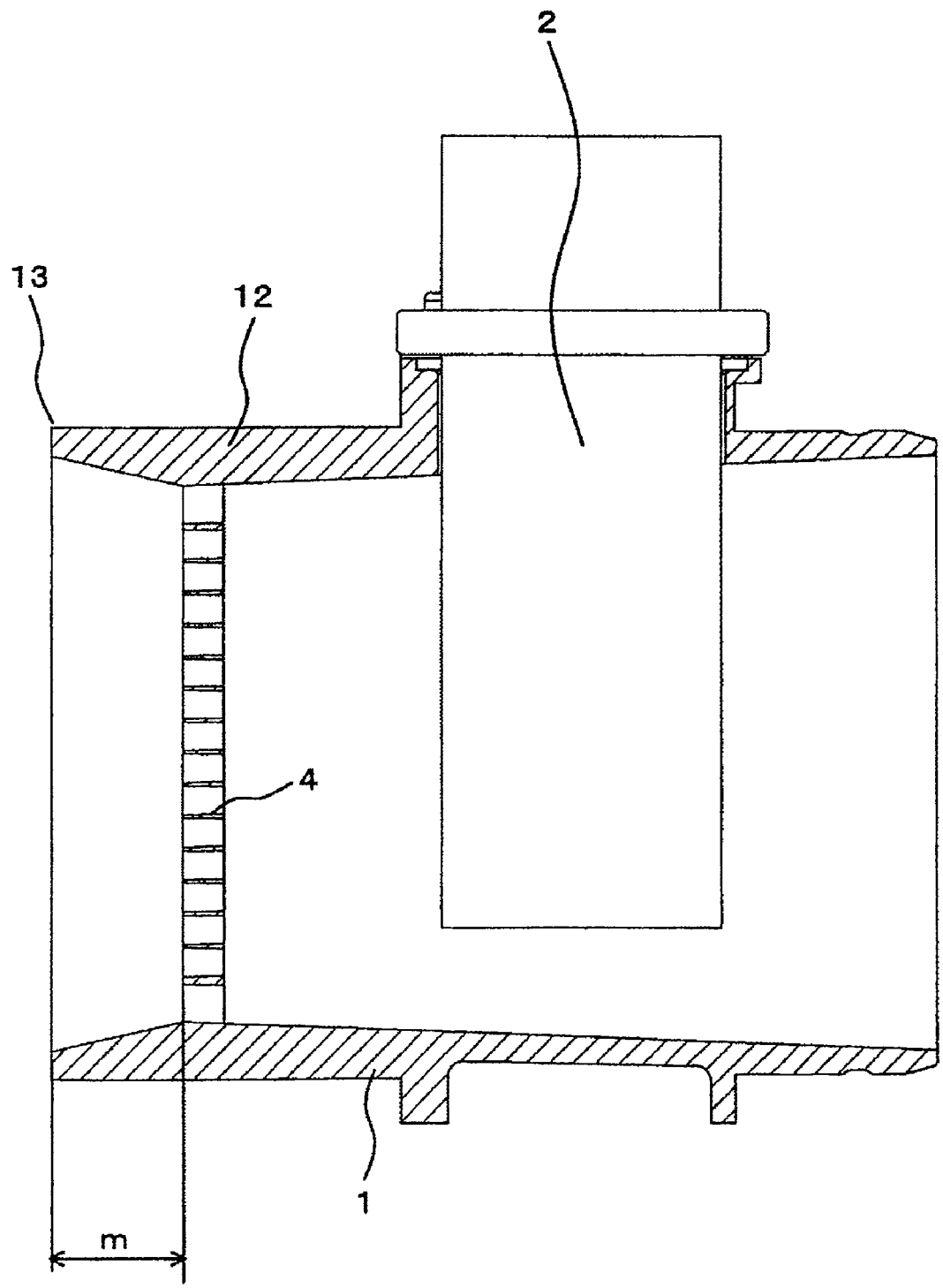
FIG. 12 is a sectional view corresponding FIG. 2 and showing a seventh embodiment of the air flow rate measuring device according to the present invention.

FIG. 12 is a sectional view corresponding FIG. 2 and showing a seventh embodiment of the air flow rate measuring device according to the present invention.

In the seventh embodiment, the rectifier grid 4 has the same configuration as that of the first embodiment shown in FIG. 1, and the rectifier grid 4 is offset from the end surface of the body 1 by a distance m, and is integrally formed with the body 1.

In the seventh embodiment, the rectifier grid 4 is described to have the configuration shown in FIG. 1, but even when the rectifier grid 4 has one of the configurations shown in FIGS. 1 to 11, similar functions and effects can be obtained.

According to the above configuration, an amount of radial shock load which is generated when the body 1 is dropped down and absorbed by the grid 7 can be reduced. This in turn reduces an amount of the angle 7-*c* of the beams 7-*a* which changes when the grid 7 absorbs the radial shock load at the time of dropping, and also reduces the concentration of stress at the roots of the beams 7-*a* when the angle 7-*b* of the beams 7-*a* is changed to the angle 7-*c*. Thus, the deformation of the grid 7 due to the shock load at the dropping can be reduced, and cracks of the beams 7-*a* of the grid 7 can be prevented.

In other words, when the body 1 is dropped down with the rectifier grid 4 which is disposed on the upstream side of the body 1 being directed downward, the body 1 is dropped with the peripheral end portion 13 being the first portion to be landed. However, the configuration of the seventh embodiment prevents the radial shock load applied to the peripheral end portion 13 of the body 1 when the body 1 is dropped from being directly transferred to the grid 7, and instead, the longitudinal portion (offset portion by distance m) of the duct 12 is deformed by the shock load, and absorbs the shock load and then transfers it to the grid 7. That is, the radial shock load applied to the peripheral end portion 13 is absorbed by the duct 12 when the duct 12 is deformed by the shock load in the direction from the outer periphery to the center thereof, which restricts the shock loads transferred to the grid 7.

Therefore, the longer the offset distance m is, the more load is restricted from being transferred to the grid 7.

Figure 13:
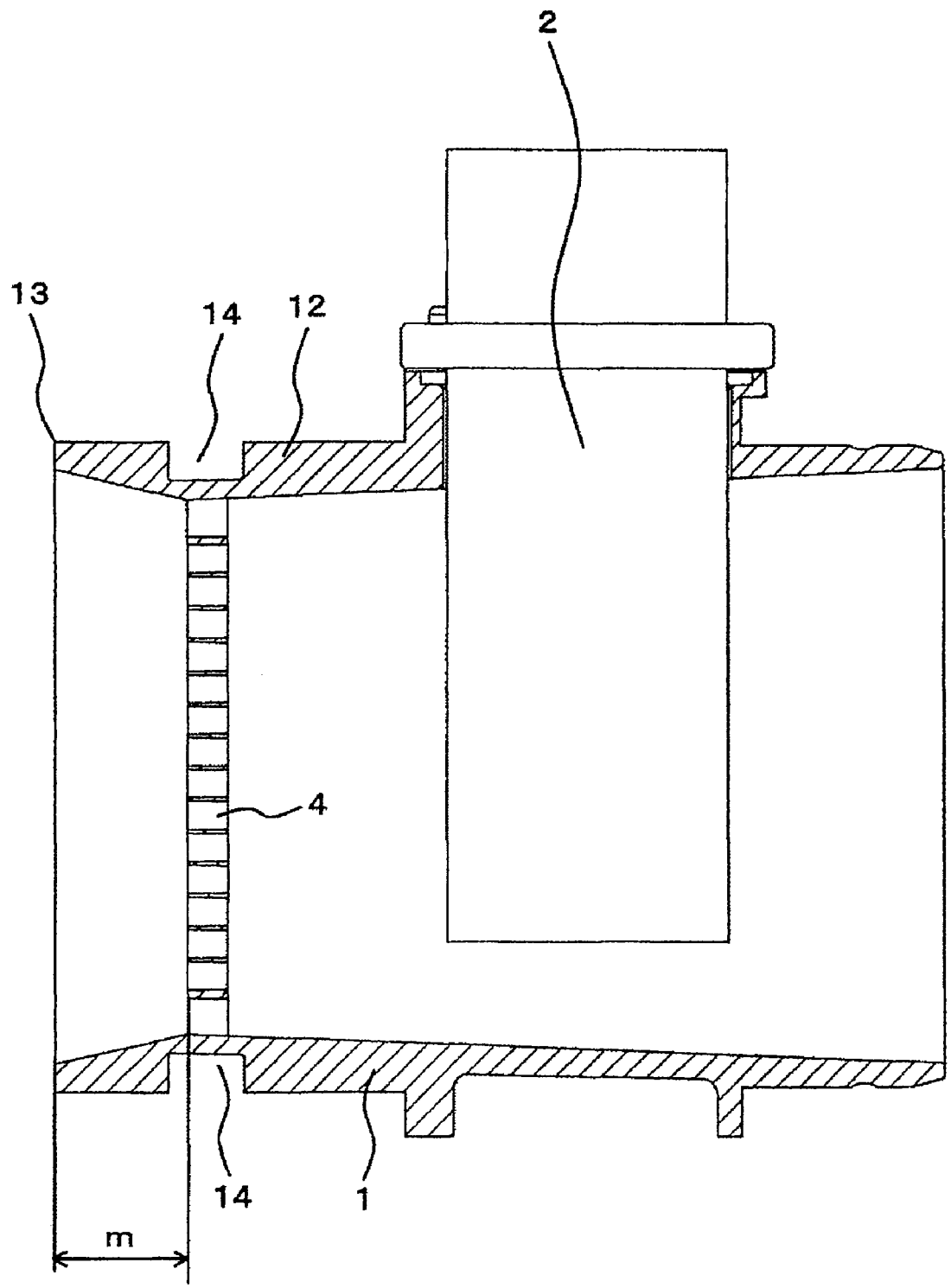
FIG. 13 is a sectional view corresponding FIG. 2 and showing an eighth embodiment of the air flow rate measuring device according to the present invention.

FIG. 13 is a sectional view corresponding FIG. 2 and showing an eighth embodiment of the air flow rate measuring device according to the present invention.

In the eighth embodiment, the rectifier grid 4 has the same configuration as that of the first embodiment shown in FIG. 1, and the rectifier grid 4 is offset from the end surface of the body 1 by a distance m, and is integrally formed with the body 1. Also, the rectifier grid 4 has a groove 14 for thickness reduction formed in the side surface around the duct 12 of the body 1.

In the eighth embodiment, the rectifier grid 4 is described to have the configuration shown in FIG. 1, but even when the rectifier grid 4 has one of the configurations shown in FIGS. 1 to 11, similar functions and effects can be obtained.

According to the above configuration, an amount of the radial shock load which is generated at the periphery 13 of the body 1 when the body 1 is dropped down and absorbed by the grid 7 can be reduced. This in turn reduces an amount of the angle 7-*c* of the beams 7-*a* which changes when the grid 7 absorbs the radial shock load at the time of dropping, and also reduces the concentration of stress at the roots of the beams 7-*a* when the angle 7-*b* of the beams 7-*a* is changed to the angle 7-*c*. Thus, the deformation of the grid 7 due to the shock load at the dropping can be reduced, and cracks of the beams 7-*a* of the grid 7 can be prevented.

Since the groove 14 for thickness reduction also functions to absorb the radial load 11 which is generated when the hose band is tightened, the radial load 11 which is transferred to the grid 7 can be restricted, and the deformation of the grid 7 can be reduced. As a result, the deformation of the grid 7 due to the radial load 11 which is generated when the hose band is tightened is restricted, and cracks at the beams 7-*a* of the grid 7 can be prevented.

Figure 14:
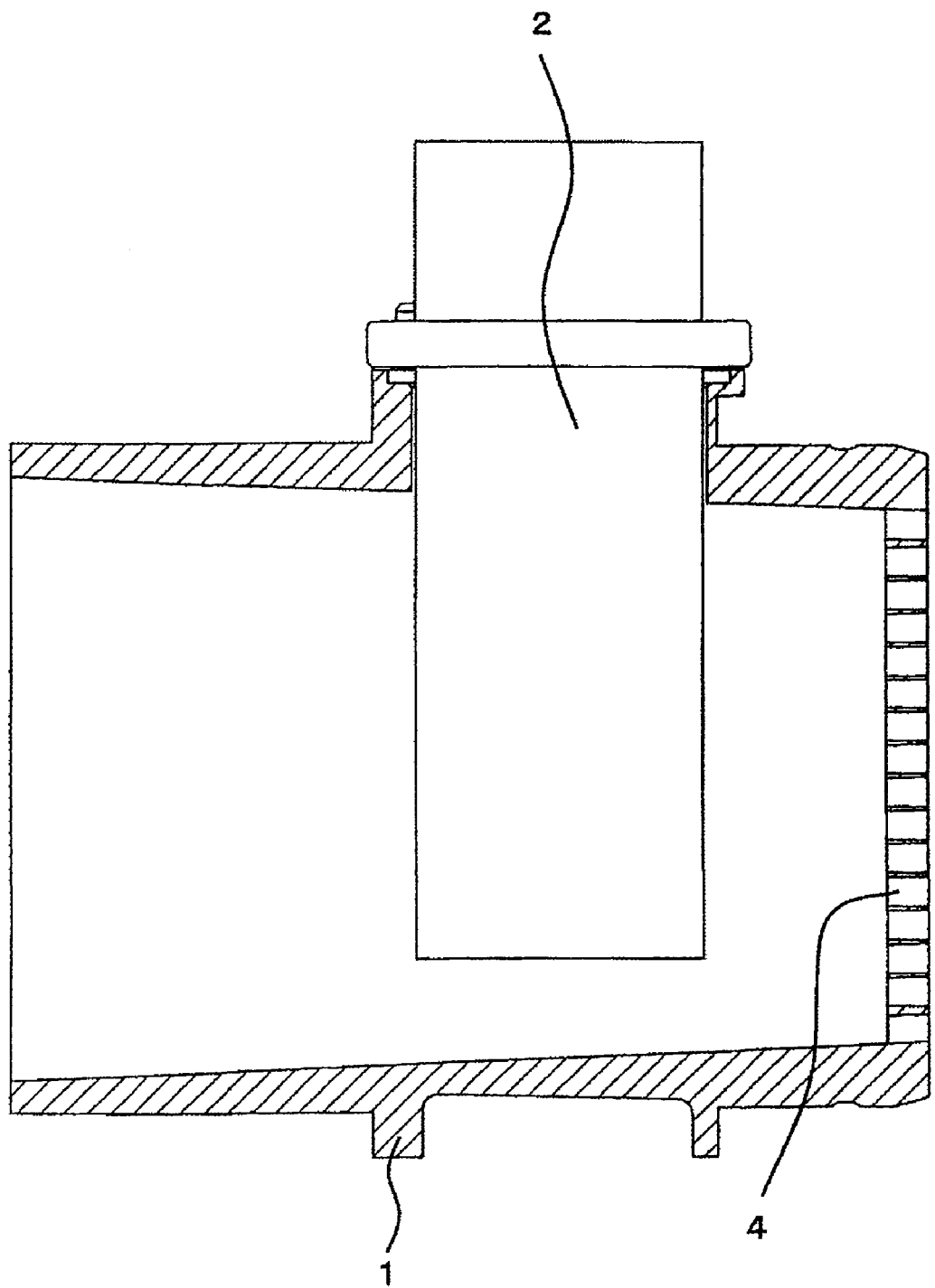
FIG. 14 is a sectional view corresponding FIG. 2 and showing a ninth embodiment of the air flow rate measuring device according to the present invention.

FIG. 14 is a sectional view corresponding FIG. 2 and showing a ninth embodiment of the air flow rate measuring device according to the present invention.

In the ninth embodiment, the rectifier grid 4 has one of the configurations shown in FIGS. 1 to 11, and the rectifier grid 4 is disposed downstream of the module 2 which has the sensing element for sensing the air flow, and is integrally formed with the body 1.

Even when the rectifier grid 4 is disposed downstream of the module 2 as in the ninth embodiment, similar functions and effects can be obtained to those described in FIGS. 1 to 11.

Figure 15:
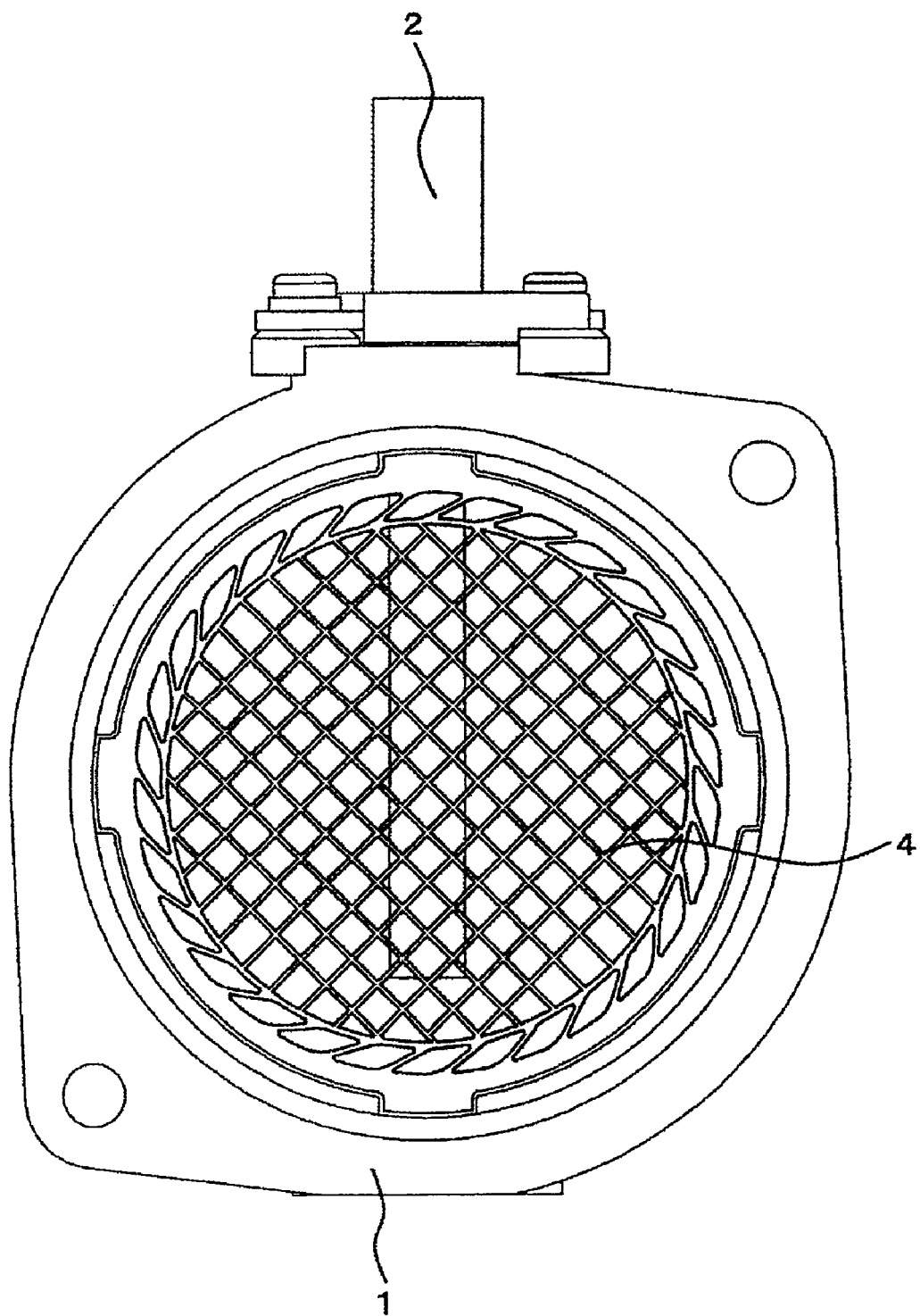
FIG. 15 is a front view of a tenth embodiment of the air flow rate measuring device according to the present invention, viewed from an upstream side of air flow.

FIG. 15 is a front view of a tenth embodiment of the air flow rate measuring device according to the present invention, viewed from an upstream side of air flow.

In the tenth embodiment, the rectifier grid 4 has one of the configurations shown in FIGS. 1 to 11, and the rectifier grid 4 is separately formed from the body 1 and is fixed to the body 1 by means of adhesive, welding, pressing, or the like so that the body 1 supports the rectifier grid 4.

Even when the rectifier grid 4 is separately formed from the body 1 as in the tenth embodiment, similar functions and effects can be obtained to those described in FIGS. 1 to 11.

Figure 16:
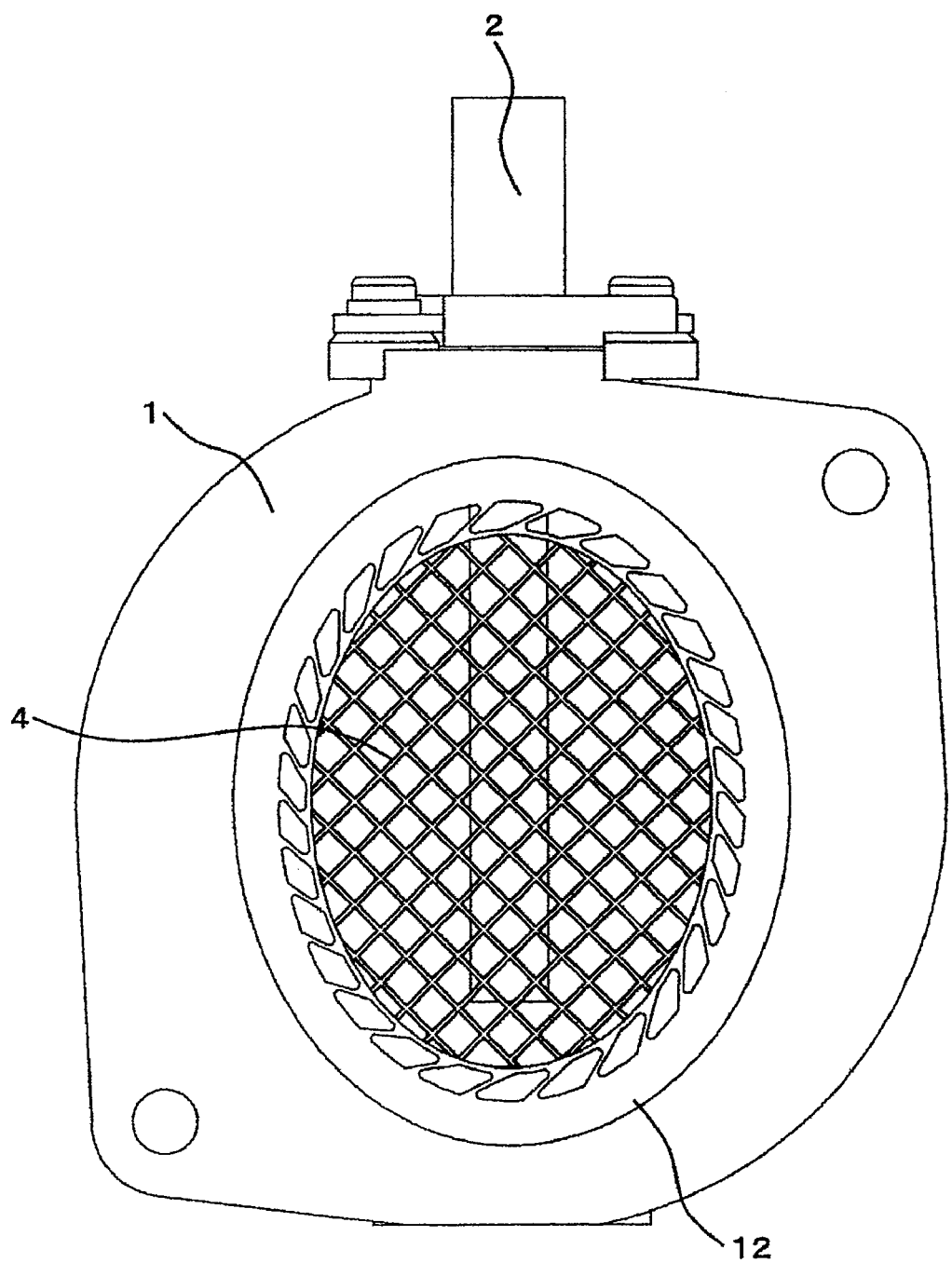
FIG. 16 is a front view of an eleventh embodiment of the air flow rate measuring device according to the present invention, viewed from an upstream side of air flow.

FIG. 16 is a front view of an eleventh embodiment of the air flow rate measuring device according to the present invention, viewed from an upstream side of air flow.

In the eleventh embodiment, the grid 7 having one of the configurations shown in FIGS. 1 to 11 is provided to the frame 5 which has an elliptical shape similar to the elliptical cross section of the body 1 as the main passage for the intake air flow, and the frame 5 includes the mesh grid 6 therein.

Even when the body has an elliptical cross section as in the eleventh embodiment, similar functions and effects can be obtained to those described in FIGS. 1 to 11.

Figure 17:
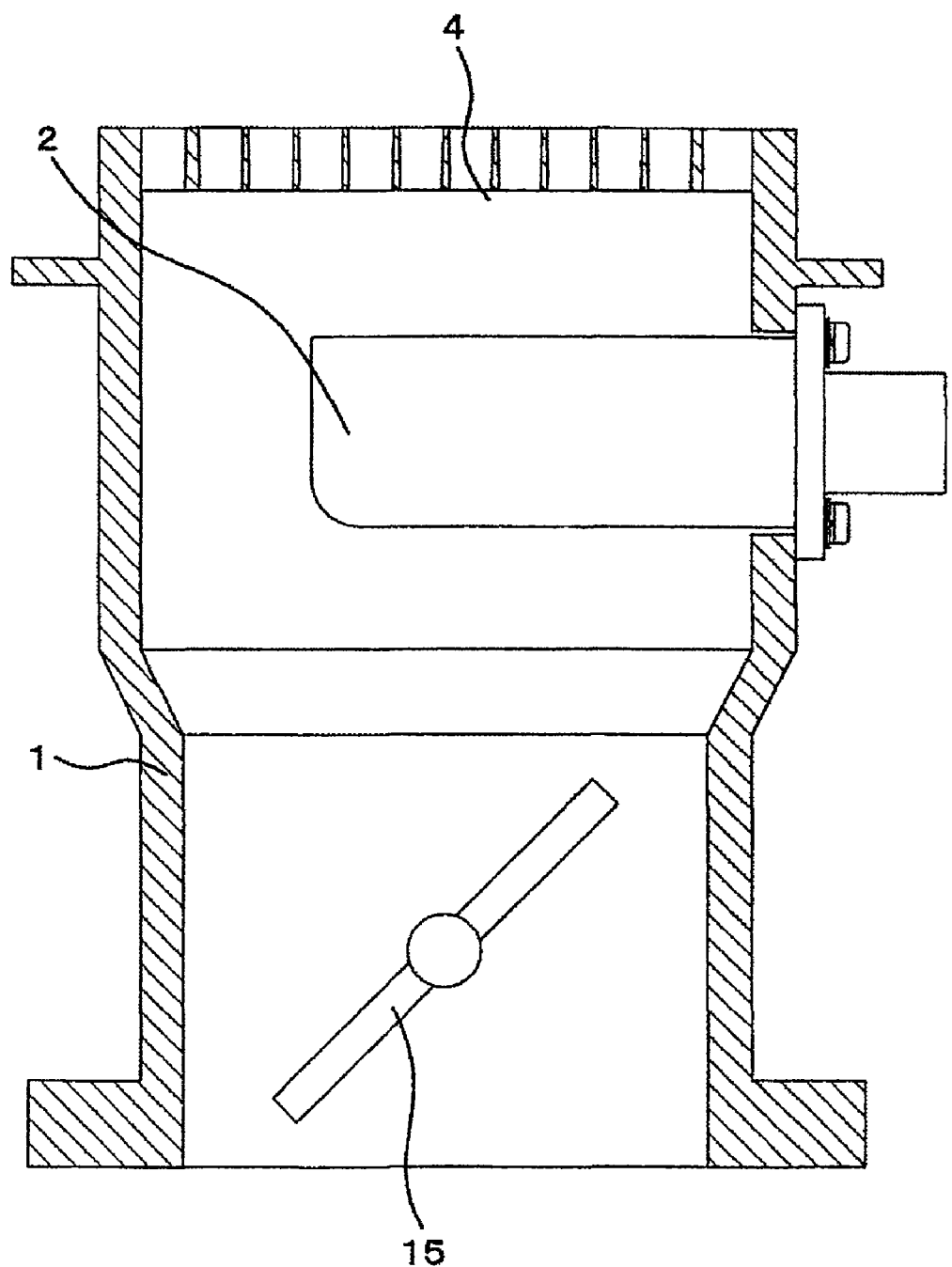
FIG. 17 is a sectional view corresponding to FIG. 2 and showing a twelfth embodiment of the air flow rate measuring device according to the present invention.

FIG. 17 is a front view of a twelfth embodiment of the air flow rate measuring device according to the present invention, viewed from an upstream side of air flow.

In the twelfth embodiment, the rectifier grid 4 having one of the configurations shown in FIGS. 1 to 11 is provided to the body 1 which has a valve 15 therein for regulating an air flow.

Even when the rectifier grid 4 is provided to the body 1 having the valve 15 as in the twelfth embodiment, similar functions and effects can be obtained to those described in FIGS. 1 to 11.

Figure 18:
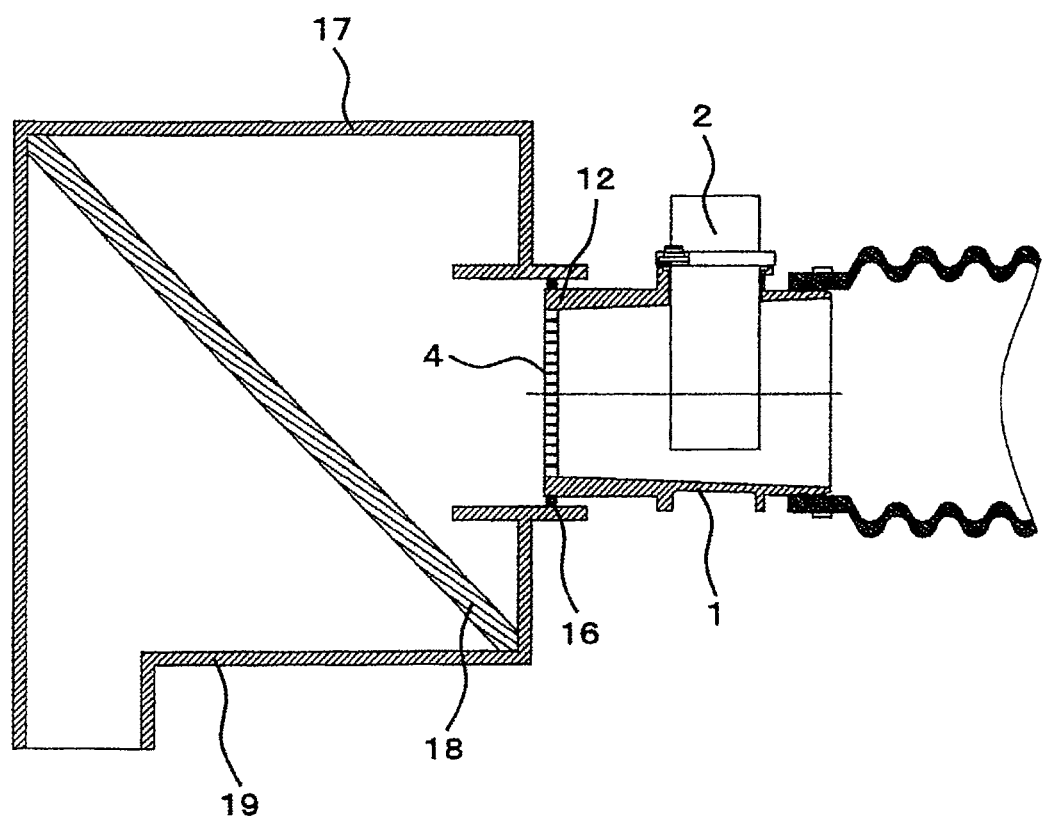
FIG. 18 is a sectional view corresponding to FIG. 4 and showing a layout of an example of an automobile air intake system in which a thirteenth embodiment of the air flow rate measuring device according to the present invention is used.

FIG. 18 is a sectional view corresponding to FIG. 4 and showing a layout of an example of an automobile air intake system in which a thirteenth embodiment of the air flow rate measuring device according to the present invention is used.

In the thirteenth embodiment, an air flow rate measuring device having the rectifier grid 4 having one of the configurations shown in FIGS. 1 to 11 includes the duct 12 of the body 1 and a clean side air cleaner 17 which are assembled to each other via a seal component 16. Upstream of the clean side air cleaner 17 is provided with an air filter 18, and a dirty side air cleaner 19.

Similar functions and effects can be obtained to those described in FIGS. 1 to 11 with respect to the radial load which is generated when the seal component 16 is assembled.

The present invention relates to an air flow rate measuring device and an air flow measuring passage, in particular, is preferable to a thermal type air flow rate measuring device and passage for measuring an air flow supplied to an internal combustion of an automobile engine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A flow rate measuring device, comprising: a flow rate measuring module introducing gas therein and measuring flow rate of the gas; a passage forming component which forms a passage; and a grid which crosses the passage, in which a part of the flow rate measuring module is inserted through an opening provided in the passage forming component to be fixed, wherein said grid includes a first grid portion and a second grid portion between the first grid portion and the passage forming component, and the second grid portion is formed to be more easily deformable than the first grid portion.

2. The flow rate measuring device according to claim 1, wherein the second grid portion is formed by only grids which are tilted relative to normal directions of an outer periphery of the first grid portion.

3. The flow rate measuring device according to claim 1, wherein the second grid portion is formed by only grids which are tilted relative to normal directions of an inner periphery of the passage forming component.

4. The flow rate measuring device according to claim 1, wherein the second grid portion is formed by grids at an intermediate of each of which a bent portion is provided.

5. The flow rate measuring device according to claim 1, wherein the first grid portion is disposed at a position including a central axis of the passage, and the second grid portion is formed so as to surround the first grid portion.

6. The flow rate measuring device according to claim 1, wherein there is provided a component which connects between the first grid portion and the second grid portion or between the second grid portion and the passage forming component.

7. The flow rate measuring device according to claim 1, wherein the measuring module has an auxiliary passage to which a thermal measuring component is disposed, and the measuring module is fixed so that an entrance of the auxiliary passage is positioned downstream of the first grid portion.

8. A flow rate measuring device, comprising: a measuring module for introducing gas therein and measuring flow rate of the gas; a passage forming component which forms a passage; and a grid which crosses the passage, in which a part of the flow rate measuring module is inserted through an opening provided in the passage forming component to be fixed, wherein there is provided means for converting deformation of the passage forming component to rotation of the grid.

9. The flow rate measuring device according to claim 8, wherein the converting means is provided between the grid and the passage forming component, and is configured with a plurality of beams which are generally spirally arranged.

10. A flow rate measuring device, comprising: a measuring module for introducing gas therein and measuring flow rate of the gas; a passage forming component which forms a passage; and a grid which crosses the passage, in which a part of the flow rate measuring module is inserted through an opening provided in the passage forming component to be fixed, wherein a plurality of beams are provided between the grid and the passage forming component and are all arranged so as to tilt relative to normal directions of an outer periphery of the grid.

11. The flow rate measuring device according to claim 10, wherein the plurality of beams are formed so that tilt angles of the beams are substantially constant and spacing between the beams are substantially constant.

12. A flow rate measuring device, comprising: a measuring module for introducing gas therein and measuring flow rate of the gas; a passage forming component which forms a passage; and a grid which crosses the passage, in which a part of the flow rate measuring module is inserted through an opening provided in the passage forming component to be fixed, wherein a plurality of beams are provided between the grid and the passage forming component and are all arranged so as to tilt relative to normal directions of an inner periphery of the passage forming component.

13. The flow rate measuring device according to claim 12, wherein the plurality of beams are formed so that tilt angles of the beams are substantially constant and spacing between the beams are substantially constant.

14. The flow rate measuring device according to claim 1, wherein the device is connected to an air intake system of an internal combustion engine.

15. A flow rate measuring passage, comprising: a passage forming component which forms a passage; and a grid which crosses the passage, in which a part of a flow measuring module for introducing gas and measuring flow rate of the gas is inserted through an opening formed in the passage forming component to be fixed, wherein said grid includes a first grid portion and a second grid portion between the first grid portion and the passage forming component, and the second grid portion is formed to be more easily deformable than the first grid portion.

16. The flow rate measuring passage according to claim 15, wherein the second grid portion is formed by only grids which are tilted relative to normal directions of an outer periphery of the first grid portion.

17. The flow rate measuring passage according to claim 15, wherein the second grid portion is formed by only grids which are tilted relative to normal directions of an inner periphery of the passage forming component.

18. The flow rate measuring passage according to claim 15, wherein the second grid portion is formed by grids at an intermediate of each of which a bent portion is provided.

19. The flow rate measuring passage according to claim 15, wherein the first grid portion is disposed at a position including a central axis of the passage, and the second grid portion is formed so as to surround the first grid portion.

20. The flow rate measuring passage according to claim 15, wherein there is provided a component which connects between the first grid portion and the second grid portion or between the second grid portion and the passage forming component.

21. The flow rate measuring passage according to claim 15, wherein the measuring module has an auxiliary passage to which a thermal measuring component is disposed, and the measuring module is fixed so that an entrance of the auxiliary passage is positioned downstream of the first grid portion, and is connected to an air intake system of an internal combustion engine.

22. A flow rate measuring passage, comprising: a passage forming component which forms a passage; and a grid which crosses the passage, in which a part of a measuring module for introducing gas therein and measuring flow rate of the gas is inserted through an opening provided in the passage forming component to be fixed, wherein there is provided means for converting deformation of the passage forming component to rotation of the grid.

23. The flow rate measuring passage according to claim 22, wherein the converting means is provided between the grid and the passage forming component, and is configured with a plurality of beams which are generally spirally arranged.

24. A flow rate measuring passage, comprising: a passage forming component which forms a passage; and a grid which crosses the passage, in which a part of a measuring module for introducing a gas therein and measuring flow rate of the gas is inserted through an opening provided in the passage forming component to be fixed, wherein a plurality of beams are provided between the grid and the passage forming component and are all arranged so as to tilt relative to normal directions of an outer periphery of the grid.

25. The flow rate measuring passage according to claim 24, wherein the plurality of beams are formed so that tilt angles of the beams are substantially constant and spacing between the beams are substantially constant.

26. A flow rate measuring passage, comprising: a passage forming component which forms a passage; and a grid which crosses the passage, in which a part of a measuring module for introducing gas therein and measuring flow rate of the gas is inserted through an opening provided in the passage forming component to be fixed, wherein a plurality of beams are provided between the grid and the passage forming component and are all arranged so as to tilt relative to normal directions of an inner periphery of the passage forming component.

27. The flow rate measuring passage according to claim 26, wherein the plurality of beams are formed so that tilt angles of the beams are substantially constant and spacing between the beams are substantially constant.

28. An air flow rate measuring device for measuring an air flow in an internal combustion engine, wherein a component which forms an air passage for air flow is formed with a grid disposed upstream or downstream of a flow rate sensing portion, said grid comprising: a frame arranged inside the air passage; a mesh grid arranged inside the frame; and beams arranged between the air passage forming component and the frame, each of said beams having an angle with respect to a radial direction of the frame, said grid being integrally formed with the component.

29. An air flow rate measuring device for measuring an air flow in an internal combustion engine, wherein a component which forms an air passage for air flow is formed with a grid disposed upstream or downstream of a flow rate sensing portion, said grid comprising: a frame arranged inside the air passage; a mesh grid arranged inside the frame; and beams arranged between the air passage forming component and the frame, said beams being tilted in the same directions relative to radial directions of the frame, said grid being integrally formed with the component.

30. An air flow rate measuring device for measuring an air flow in an internal combustion engine, wherein a component which forms an air passage for air flow is formed with a grid disposed upstream or downstream of a flow rate sensing portion, said grid comprising: a frame arranged inside the air passage; a mesh grid arranged inside the frame; and beams arranged between the air passage forming component and the frame, said beams having, in the same directions, angles with respect to radial directions of the frame, said grid being integrally formed with the component.

31. An air flow rate measuring device for measuring an air flow in an internal combustion engine, wherein a component which forms an air passage for air flow is formed with a grid disposed upstream or downstream of a flow rate sensing portion, said grid comprising: a frame arranged inside the air passage; a mesh grid arranged inside the frame; and beams arranged between the air passage forming component and the frame, each of said beams having one or more bent portions, said grid being integrally formed with the component.

32. The air flow rate measuring device according to claim 28, wherein the air passage forming component, the frame, the beams and the mesh grid are integrally formed with one another.

33. The air flow rate measuring device according to claim 32, wherein the grid comprising the frame, the beams and the mesh grid is offset from an end surface of the air passage forming component.

34. The air flow rate measuring device according to claim 32, wherein a groove for thickness reduction is formed in a side surface of the air passage forming component around the position where the grid comprising the frame, the beams and the mesh grid is mounted.

35. The air flow rate measuring device according to claim 28, wherein the frame has substantially the same shape to the cross section of the air passage forming component, and is substantially concentrically disposed within the air passage forming component.

36. An air flow rate measuring device, comprising: a flow rate sensing portion for measuring flow rate of intake air of an internal combustion engine; a body which has a circular or elliptical cross section and forms a main air passage for the intake air; and a grid disposed upstream or downstream of the flow rate sensing portion, wherein the grid comprises: a circular or elliptical frame which has a substantially identical shape to that of the body and is substantially concentrically disposed within the body; a mesh grid in the frame; and beams between the body and the frame, said beams being substantially equally spaced from each other and being arranged in substantially the same direction at an acute angle relative to radial directions of the frame, the body and the grid including the frame, the beams and the mesh grid being integrally formed with each other.

37. The air flow rate measuring device according to claim 36, wherein the beams have side surfaces which are tilted at different angles, and the angles are set so that the width of the beams tapers from the inner peripheral portion of the body toward the frame.

* * * * *